Patented July 15, 1924.

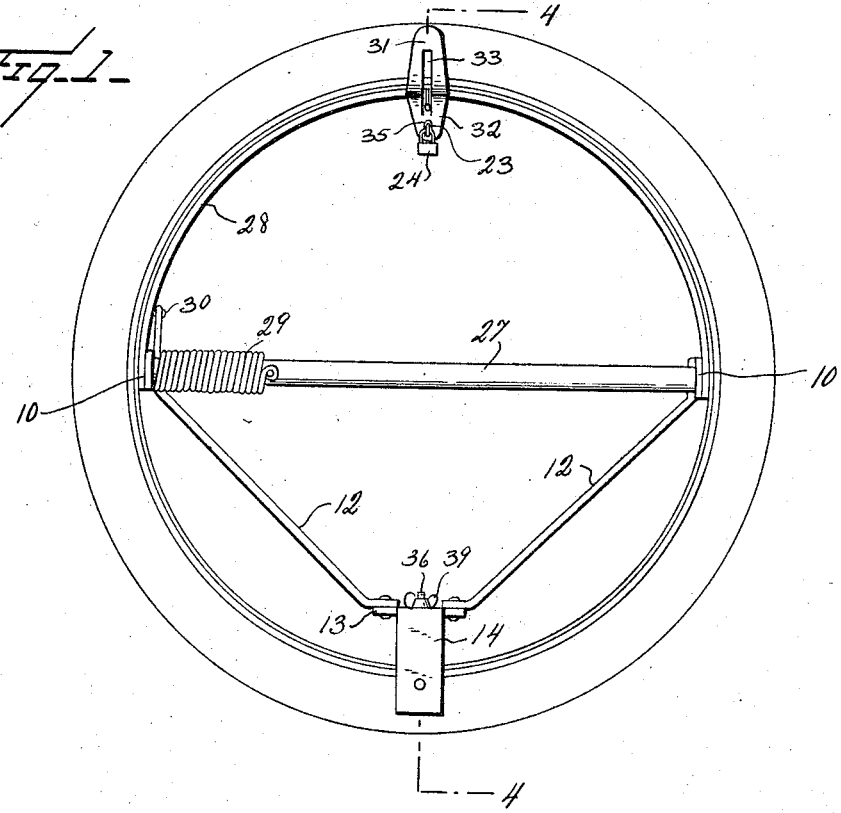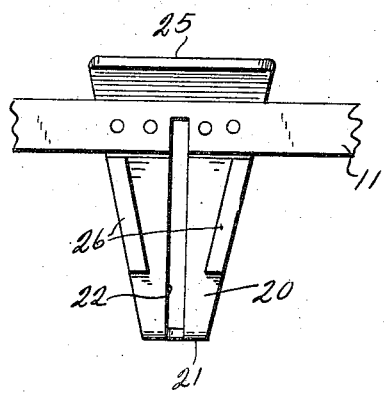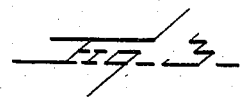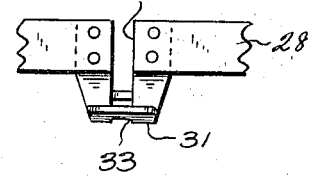

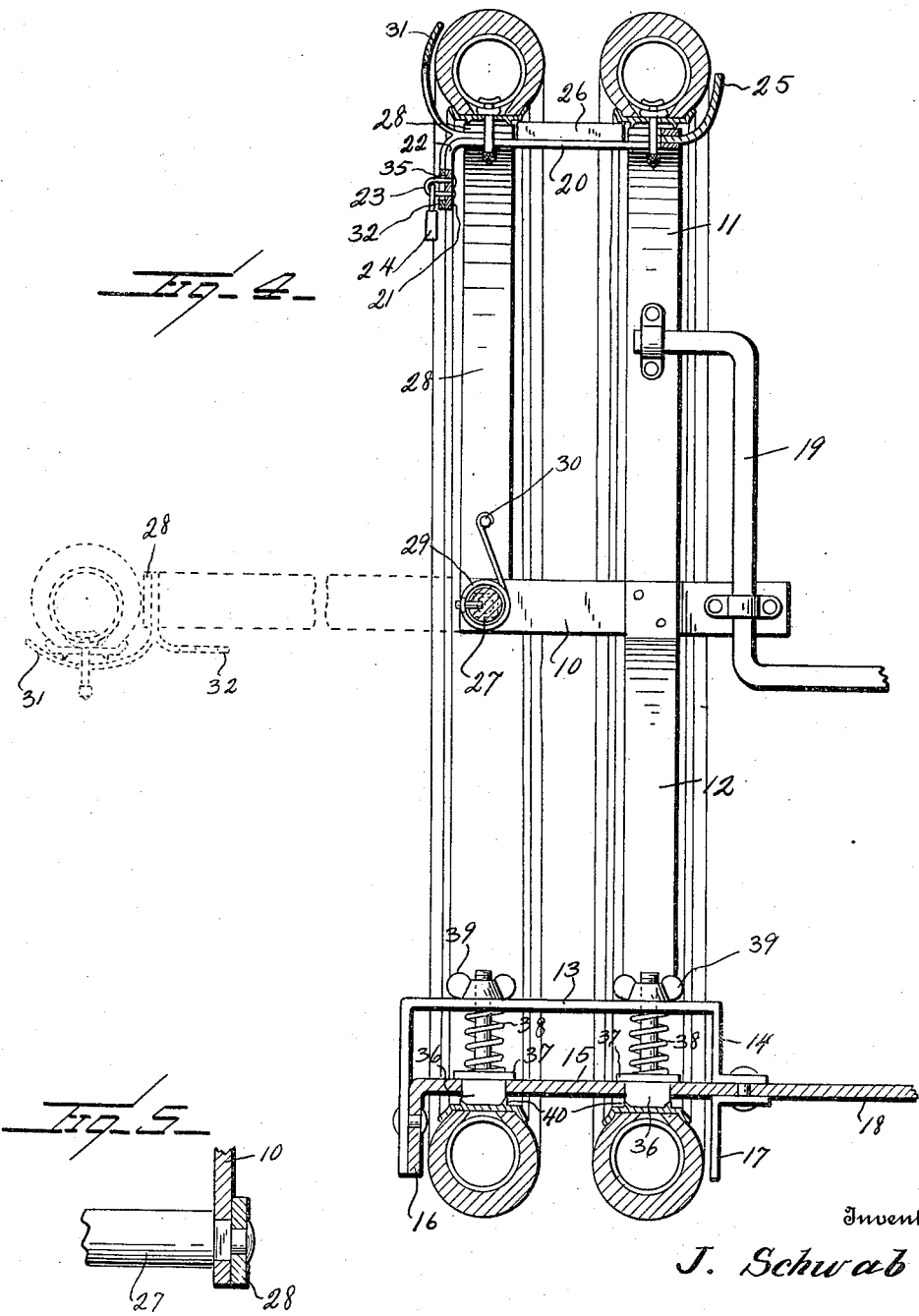

1,501,470

UNITED STATES PATENT OFFICE.

JOHN SCHWAB, OF CHICAGO, ILLINOIS.

AUTOMOBILE-TIRE RACK.

Application filed May 6, 1922. Serial No. 558,897.

*To all whom it may concern:*

Be it known that I, JOHN SCHWAB, a citizen of the United States, residing at Chicago, in the county of Cook and State of Illinois, have invented certain new and useful Improvements in Automobile Tire Racks, of which the following is a specification, reference being had to the accompanying drawings.

This invention relates to improvements in tire racks, and more particularly to tire racks adapted for use on automobiles.

An important object of the invention is to provide a tire rack having means for elevating the tire into position thereon or for assisting in such elevation.

A further object of the invention is to provide means for holding the tires when in position upon the rack to prevent movement thereof.

A still further object of the invention is to provide a tire rack which while adapted for holding a plurality of tires may be employed for holding a single tire and this single tire will be held against movement upon the rack.

An additional object of the invention is to provide a device of this character which is simple in construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a rear elevation of a tire rack constructed in accordance with my invention;

Figure 2 is a detail view showing the resilient tongue of the stationary section of the rack;

Figure 3 is a detail view showing the manner of slotting the shiftable section of the rack;

Figure 4 is a section taken on the line 4—4 of Figure 1; and

Figure 5 is a detail view showing the mounting of the shaft.

Referring now more particularly to the drawings, the numeral 10 designates substantially horizontal spaced braces to which are secured the lower ends of a substantially semi-circular support member 11. Secured to the braces and depending therefrom are the ends of the arms 12 of a substantially V-shaped member having at the bight portion thereof a plate 13 substantially horizontally extending and provided at its ends with vertical feet 14 to which is secured a plate 15 the rear end of which is provided with a down-turned flange 16. At a point spaced inwardly from the down-turned flange 16 upon the lower face of the plate 15 is a second flange 17 facing the flange 16. The inner end of the plate is provided with an extension 18 for engagement with the body of the vehicle to which the tire carrier is to be attached, and secured to the support 11 and to the horizontal braces 10 are further attaching members 19 likewise adapted for engagement with the vehicle.

The support 11 is provided at the upper central portion thereof with a rearwardly extending flexible tongue 20, the rear end of which is provided with a down-turned portion 21 having a slot 22 formed therein, and provided at its lower end with a staple 23 adapted for the reception of the bolt of a locking member 24. The semi-circular support 11 has at its forward face, or that face which is arranged next adjacent the vehicle, a flange 25 which may be continued throughout the length of the semi-circular member or only continued for a short distance, as desired. Formed upon the resilient tongue 20 are lugs 26, the purpose of which will hereinafter appear.

A horizontally disposed member 27 has its ends secured in the rear ends of the supports 10 so as to be held against rotation with relation thereto, and this member has rotatably mounted thereon the lower ends of a substantially semi-circular tire elevator 28. A spring 29 surrounds the member 27 and has one end thereof secured to the tire elevator, as at 30, and the other end thereof secured to the member so that this spring is tensioned upon movement of the tire elevator to the horizontal position. This tire elevator embodies a horizontally disposed flange having extending upwardly therefrom at the upper or central portion thereof, a curved flange 31 and at the same point extending downwardly therefrom a flange 32 corresponding in its shaping to the flange 21 of the resilient tongue 20 of the support 11. At a point aligning with the slot 22 of the flange 21, the flanges 31 and 32 and the supporting member are provided with aligned coacting slots 33 and 34. Below its slot 34 the flange 32 has formed therein an opening 35 through which the staple 23 of the flange 21 may extend. Extending through the plates 13 and 15 are bolts 36 having shoulders 37 limiting the movement of the bolts through the plate 15. Between the plate 13 and the shoulders 37, springs 38 surround the bolts and normally maintain the shoulders in engagement with the plate 15. These bolts have the shank portions thereof which are surrounded by the springs externally screw-threaded, and the end portions thereof extending above the plate 13 are engaged by wing nuts 39 so that the bolts may be withdrawn against the tension of the springs 38 when it is so desired. These bolts have their lower end portions of sufficient size to extend between the shoulder ridges 40 formed upon the under surface of the ordinary tire rim.

In employing my device, when it is desired to place a tire upon the carrier, the flange 32 is engaged with the fingers and the elevator 28 drawn downwardly to a horizontal position in which position the tire may be applied to the flange 31 with the air valve 41 thereof extending through the slot 33. Upon release of the carrier the spring 29 will elevate or tend to elevate the same so that it may be elevated with but a slight pressure from the hand. Before the elevator arrives at its uppermost position the lower portion of the tire is hooked over the flange 16 by pushing the same with the foot. When the elevator arrives at its uppermost position, the tire during its rotation has moved the valve 41 through the slot 33 into the slot 34 of the flange 32 and through this slot into the slot 22 of the flange 21, finally arriving at a vertical position with the valve thereof disposed through the slot of the resilient tongue 20. By forcing the tire rearwardly with the hands, the same may be passed over the lugs 26 of the spring tongue which will yield to permit of this movement and by the same means the tire may be forced from the first of the bolts 36 into engagement with the second thereof so that a second tire may be applied to the carrier, the bolts 36 being withdrawn by means of the wing nuts 39 if so desired. When the tire or tires are in position, the device may be locked by passing the bolt of the lock 24 through the staple 23 and removal of the tire will be prevented, since the tire will lie at diametrically opposed points between opposed flanges, at the upper end between the flanges 25 and 31 and at the lower end between the flanges 16 and 17. It will furthermore be obvious that the coaction of the lugs 26 with the tire will prevent slipping thereof upon the holder at the upper end and the bolts 36 by their engagement at the lower end will prevent movement at this end, thus preventing the rubbing to which tires are very often subjected when placed upon carriers.

From the foregoing it is believed to be obvious that a tire rack constructed in accordance with my invention is particularly well adapted for the purpose for which it is intended for the reason that it provides means whereby the tire may be elevated into position without the necessity of lifting the entire weight thereof, and furthermore in that it provides means for preventing slipping of the tire upon the carrier. It will furthermore be obvious that the construction as hereinbefore set forth is capable of some change and modification without materially departing from the spirit of my invention, and I accordingly do not limit myself thereto except as hereinafter claimed.

I claim:—

1. In a tire rack, the combination with a tire support adapted to engage beneath a tire to support the same, of means for maintaining a tire in position upon the support shiftable to engage and elevate a tire into position upon the support.

2. In a tire rack, a tire support embodying a stationary section adapted to engage beneath a tire to support the same and a section shiftable to engage and elevate a tire into position upon the stationary section, and a spring maintaining said sections in engaged relation.

3. In a tire rack, a tire support embodying a stationary tire supporting section and a section shiftable to engage and elevate a tire into position upon the stationary section, a spring resisting separation of said sections, and means for locking said sections in engaged relation.

4. In a tire rack, a tire support embodying a stationary section and a section shiftable to engage and elevate a tire into position upon the stationary section, said stationary section embodying a resilient tongue receiving the tire and shifting to permit passage of a tire thereover, and means connecting said resilient tongue and shiftable section preventing shifting of the shiftable tongue.

5. In a tire rack, spaced pairs of opposed flanges adapted to receive a tire therebetween at diametrically opposed points, one of the flanges of one of said pairs being shiftable to engage and elevate a tire into engagement with the other flange of the pair.

6. In a tire rack, spaced pairs of opposed flanges adapted to receive a tire therebetween at diametrically opposed points, one of the flanges of one of said pairs being shiftable to engage and elevate a tire into engagement with the other flange of the pair, and means for locking said shiftable flange against movement.

7. A tire rack embodying a substantially semi-circular support provided at the central portion thereof with an upstanding flange, a second member provided with a flange opposing the flange of the semi-circular member, a shaft maintaining the ends of the semi-circular member in spaced relation and upon which the second member is rotatably mounted, and a spring connecting said shaft and second member whereby the second member is normally maintained in engagement with the central portion of the semi-circular member, said second member embodying a flange adapted for the reception of a tire.

8. A tire rack embodying a substantially semi-circular support provided at the central portion thereof with an upstanding flange, a second member provided with a flange opposing the flange of the semi-circular member, a shaft maintaining the ends of the semi-circular member in spaced relation and upon which the second member is rotatably mounted, a spring connecting said shaft and second member whereby the second member is normally maintained in engagement with the central portion of the semi-circular member, said second member embodying a flange adapted for the reception of a tire, and means for engaging a tire disposed between the flanges of said members at a point diametrically opposed upon the interior of the tire from the point of engagement by said members for maintaining the tire against movement.

9. In a tire rack, a tire support embodying a stationary tire supporting section and a section shiftable to engage and elevate a tire into position upon the stationary section, a spring maintaining said sections in engaged relation, means for locking said sections in engaged relation, said stationary and shiftable sections each embodying a flange, a tire supported by said tire supporting section being disposed intermediate said flanges when said sections are in engaged relation, and means engaging the tire at a point spaced from said flanges preventing elevation of the tire to permit disengagement thereof from said stationary supporting section.

10. In a tire rack, the combination with a tire support adapted to engage beneath a tire to support the same, of means for maintaining a tire in position upon the support shiftable to engage and elevate a tire into position upon the support, and means engaging the tire when in position upon the support preventing vertical movement of the tire.

11. In a tire rack, the combination with a tire support, of means for maintaining a tire in position upon the support shiftable to engage a tire at a portion of its inner periphery and to elevate said tire and deliver such portion into position upon the support.

12. In a tire rack, the combination with a tire support, of means for maintaining a tire in position upon the support shiftable to engage a tire at a portion of its inner periphery and to elevate said tire and deliver such portion into position upon the support, the engaged portion of the tire including the valve stem of the tube thereof, said means embodying a slot receiving the tube valve, said support further embodying a slot adapted for the reception of the tube valve, said means in its delivery transferring the tube valve from its slot to the slot of said support.

13. In a tire rack, the combination with a tire support, of means for maintaining a tire in position upon the support shiftable to engage a tire at a portion of its inner periphery and to elevate said tire and deliver such portion into position upon the support, the engaged portion of the tire including the valve stem of the tube thereof, said means embodying a slot receiving the tube valve, said support further embodying a slot adapted for the reception of the tube valve, said means in its delivery transferring the tube valve from its slot to the slot of said support, and means engaging the tire when in position upon the support preventing vertical movement of the tire with relation to the support.

14. A tire rack for tire assembly including a diametrically extending portion comprising a tire support having a slot for the reception of such diametrically extending portion and a shiftable member adapted to engage the tire having a slot for the reception of such diametrically extending portion, said shiftable member being normally engaged with said tire support and when engaged therewith having the slot thereof aligned with the slot of the tire support whereby the tire engaged by said shiftable member for delivery to said support has the diametrically extending portion thereof directed into the slot of said support.

In testimony whereof I hereunto affix my signature.

JOHN SCHWAB.